(12) United States Patent
Muthu et al.

(10) Patent No.: US 10,284,850 B2
(45) Date of Patent: May 7, 2019

(54) METHOD AND SYSTEM TO CONTROL BIT RATE IN VIDEO ENCODING

(71) Applicant: RIVERSILICA TECHNOLOGIES PVT LTD, Bangalore (IN)

(72) Inventors: Essaki P Muthu, Bangalore (IN); Jagadish K Kamath, Bangalore (IN); Sudhir Kesti, Bangalore (IN)

(73) Assignee: RIVERSILICA TECHNOLOGIES PVT LTD, Bangalore (IN)

( * ) Notice: Subject to any disclaimer, the term of this patent is extended or adjusted under 35 U.S.C. 154(b) by 111 days.

(21) Appl. No.: 15/036,809

(22) PCT Filed: Nov. 14, 2014

(86) PCT No.: PCT/IB2014/066039
§ 371 (c)(1),
(2) Date: May 14, 2016

(87) PCT Pub. No.: WO2015/071865
PCT Pub. Date: May 21, 2015

(65) Prior Publication Data
US 2016/0277737 A1  Sep. 22, 2016

(30) Foreign Application Priority Data
Nov. 14, 2013 (IN) ............................ 5159/CHE/2013

(51) Int. Cl.
*H04N 19/176* (2014.01)
*H04N 19/126* (2014.01)
*H04N 19/172* (2014.01)
(Continued)

(52) U.S. Cl.
CPC ......... *H04N 19/126* (2014.11); *H04N 19/115* (2014.11); *H04N 19/127* (2014.11);
(Continued)

(58) Field of Classification Search
CPC ............... H04N 19/176; H04N 19/172; H04N 21/23406; H04N 5/33; G02B 27/017
(Continued)

(56) References Cited

U.S. PATENT DOCUMENTS 5,283,646 A    2/1994  Bruder
5,990,957 A *  11/1999  Ryoo ....................... 375/240.03
(Continued)

*Primary Examiner* — Albert Kir
(74) *Attorney, Agent, or Firm* — Maschoff Brennan

(57) ABSTRACT

The present disclosure relates to a method and a system for controlling bit rate and quantization step size of each frame of a plurality of frames of a video in encoding of the video. The method includes determining a bit budget for the each frame by utilizing a first pre-determined criterion, altering computed target bits based on complexity of the each frame by utilizing a third pre-determined criterion, evaluating quantization states for the each frame using a pre-determined quantizing criterion, and updating a controlling module based on data of the each frame. The target bits are computed for the each frame by utilizing a second pre-determined criterion and the third pre-determined criterion is based on the determined bit budget and a histogram gradient. The evaluated quantization state is allotted to the each frame based on the determined bit budget and the computed target bits.

10 Claims, 4 Drawing Sheets

(51) Int. Cl.
| | |
|---|---|
| *H04N 19/115* | (2014.01) |
| *H04N 19/14* | (2014.01) |
| *H04N 19/895* | (2014.01) |
| *H04N 19/127* | (2014.01) |
| *H04N 19/154* | (2014.01) |
| *H04N 19/18* | (2014.01) |
| *H04N 5/33* | (2006.01) |
| *H04N 19/142* | (2014.01) |

(52) U.S. Cl.
CPC ........... *H04N 19/14* (2014.11); *H04N 19/154* (2014.11); *H04N 19/172* (2014.11); *H04N 19/18* (2014.11); *H04N 19/895* (2014.11); *H04N 19/142* (2014.11)

(58) Field of Classification Search
USPC ........................................ 375/240.03, 240.02
See application file for complete search history.

(56) References Cited

U.S. PATENT DOCUMENTS

| | | | |
|---|---|---|---|
| 6,215,561 B1 | 4/2001 | Kakutani | |
| 6,295,009 B1 | 9/2001 | Goto | |
| 7,372,903 B1 | 5/2008 | Lee et al. | |
| 8,538,176 B2* | 9/2013 | Closset | H04N 21/23406 382/232 |
| 9,081,181 B2* | 7/2015 | Lee | G02B 27/017 |
| 2004/0042548 A1* | 3/2004 | Yu | H04N 19/172 375/240.03 |
| 2005/0175096 A1 | 8/2005 | Lee | |
| 2008/0101464 A1 | 5/2008 | Lei | |
| 2009/0092186 A1 | 4/2009 | Otsuka | |
| 2011/0141219 A1 | 6/2011 | Yeh | |
| 2012/0219067 A1 | 8/2012 | Jefremov et al. | |

* cited by examiner

METHOD AND SYSTEM TO CONTROL BIT RATE IN VIDEO ENCODING

TECHNICAL FIELD

The present invention relates to the field of video encoding, and in particular, relates to controlling bit rate and quantization step size in video encoding.

BACKGROUND

In this Internet era, popularity of playing streaming audio and video over networks are increasing by leaps and bounds. With this increase, there is a need for optimizing data transferred from a server to a user such that user's experience is maximized even if network conditions during playback are inconsistent. The experience of the user is optimized by choosing a quality level for encoding the audio and the video portions of a video playback such that the video can be transferred and re-constructed while preserving required quality of the video content.

In general, the quality level is generally dictated by bit rate specified for encoded video portions of input stream. A higher bit rate implies that a large amount of information about an original video is encoded and retained. The large amount of information leads to a more accurate reproduction of the original video presented during the video playback. On the same lines, a lower bit rate implies that less information about the original video is encoded and retained. This leads to a less accurate reproduction of the original video presented during the video playback. The bit rate is specified for encoding the video and is based on several factors such as network condition, start up latency, tolerance to glitching, etc. A network connection which has the ability to transfer huge amount of data implies that the higher bit rate can be specified for the video that is subsequently transferred over a network connection.

Nowadays, currently available multi-bit rate video streaming systems use a constant bit rate approach to encode each alternative video stream. But, in practical scenarios, a typical video generally include scenes having a wide variety of visual complexity. Thus, the constant bit rate approach does not efficiently encode video segments with different quality. Moreover, the constant bit rate approach unnecessarily spends many bits for encoding low complexity video segments. Further, the high complexity scenes are allocated few bits. Thus, the constant bit rate approach to encode alternative streams results in undesirable and inconsistent video quality for Internet streaming.

In light of the above discussion, there is a need for a method and system which overcomes all the above stated disadvantages.

SUMMARY

In an aspect of the present disclosure, a method for controlling bit rate and quantization step size of each frame of a plurality of frames of a video in encoding of the video is provided. The method includes determining a bit budget for the each frame of the plurality of frames of the video by utilizing a first pre-determined criterion, altering computed target bits based on complexity of the each frame by utilizing a third pre-determined criterion, evaluating quantization states for the each frame using a pre-determined quantizing criterion, and updating a controlling module based on data of the each frame. The target bits are computed for the each frame by utilizing a second pre-determined criterion and the third pre-determined criterion is based on the determined bit budget and a histogram gradient. The evaluated quantization state is allotted to the each frame based on the determined bit budget and the computed target bits. The data is extracted during the evaluation of the quantization states and the controlling module is utilized for the controlling of the bit rate and the quantization step size of the frame of the plurality of frames of the video in the encoding of the video.

In an embodiment of the present disclosure, the method includes clipping of the computed target bits of the each frame of the plurality of frames in prior to the altering of the computed target bits of the each frame of the plurality of frames.

In another embodiment of the present disclosure, the bit rate and the quantization step size is controlled based on at least one of complexity of the each frame of the plurality of frames, number of bits spent per second in the encoding of the each frame of the plurality of frames, the quantization states and the bit budget of the each frame of the plurality of frames.

In yet another embodiment of the present disclosure, the method includes refining the evaluated quantization states of the each frame of the plurality of frames using a plurality of pre-determined refining criteria.

In yet another embodiment of the present disclosure, the method includes smoothening the refined quantization states of the each frame of the plurality of frames and the smoothening is based on a group of pictures and number of frames per second.

In yet another embodiment of the present disclosure, the method includes allotting the quantization states to each of one or more macroblocks of the each frame of the plurality of frames of the video.

In yet another embodiment of the present disclosure, the method includes encoding the each frame of the plurality of frames with the allotted quantization states.

In yet another embodiment of the present disclosure, the method includes decoding the each encoded frame of the plurality of frames of the video.

In another aspect of the present disclosure, a system for controlling bit rate and quantization step size of each frame of a plurality of frames of a video in encoding of the video is provided. The system includes a controlling module to control the bit rate and the quantization step size of the each frame. The controlling module further includes a determination module to determine a bit budget for the each frame utilizing a first pre-determined criterion, a computational module to alter computed target bits based on complexity of the each frame by utilizing a third pre-determined criterion, an evaluation module to evaluate quantization states for the each frame of the plurality of frames of the video using a pre-determined quantizing criterion; and an updating module to update the controlling module based on data of the each frame. The data is extracted during the evaluation of the quantization states.

In an embodiment of the present disclosure, the system includes one or more sensors to detect location of one or more users viewing one or more videos on corresponding one or more communication devices.

In another embodiment of the present disclosure, the system includes a processor to process information corresponding to at least the detected location of the corresponding one or more users.

In yet another embodiment of the present disclosure, the evaluation module allots the evaluated quantization states to the each frame of the plurality of frames based on the determined bit budget.

In yet another embodiment of the present disclosure, the evaluation module assigns the evaluated quantization states to the each frame of the plurality of frames based on the computed target bits.

In yet another embodiment of the present disclosure, the evaluation module allots the quantization states to each of one or more macroblocks of the each frame of the plurality of frames of the video.

In yet another embodiment of the present disclosure, the system includes a clipping module to clip the computed target bits of the each frame of the plurality of frames in prior to the altering of the computed target bits of the each frame of the plurality of frames.

In yet another embodiment of the present disclosure, the system includes a refining module to refine the evaluated quantization states of the each frame of the plurality of frames using a plurality of pre-determined refining criteria.

In yet another embodiment of the present disclosure, the system includes a smoothening module to perform smoothening of the refined quantization states of the each frame of the plurality of frames and the smoothening is based on a group of pictures and number of frames per second.

In yet another embodiment of the present disclosure, the system includes a storing module to store the computed target bits, the allotted quantization states and characteristics of one or more pictures of the each frame of the plurality of frames of the video for future reference.

In yet another embodiment of the present disclosure, the system includes an encoder to encode the each frame with the allotted quantization states and a decoder to decode the each encoded frame of the plurality of frames.

In yet another aspect of the present disclosure, a computer system for controlling bit rate and quantization step size of each frame of a plurality of frames of a video in encoding of the video is provided. The computer system includes one or more processors; and a non-transitory memory containing instructions that, when executed by the one or more processors, causes the one or more processors to perform a set of steps. The set of steps includes determining a bit budget for the each frame of the plurality of frames of the video by utilizing a first pre-determined criterion, altering computed target bits based on complexity of the each frame by utilizing a third pre-determined criterion, evaluating quantization states for the each frame using a pre-determined quantizing criterion and updating a controlling module based on data of the each frame.

The data is extracted during the evaluation of the quantization states, and the controlling module is utilized for the controlling of the bit rate and the quantization step size of the each frame of the plurality of frames of the video in the encoding of the video. The target bits are computed for the each frame by utilizing a second pre-determined criterion and the third pre-determined criterion is based on the determined bit budget and a histogram gradient. The evaluated quantization state is allotted to the each frame based on the determined bit budget and the computed target bits.

BRIEF DESCRIPTION OF THE FIGURES

Figure 1:
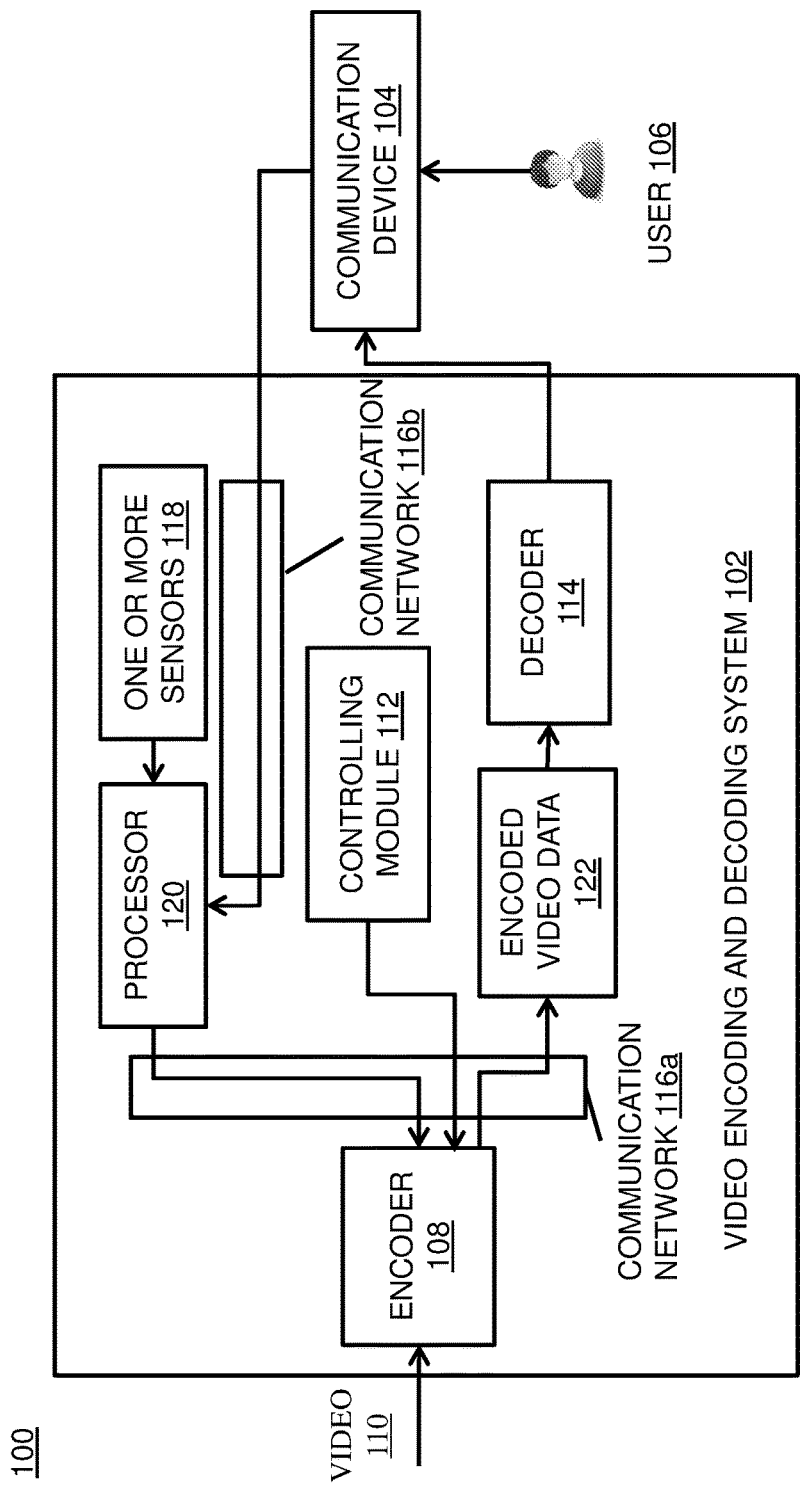
Figure 2:
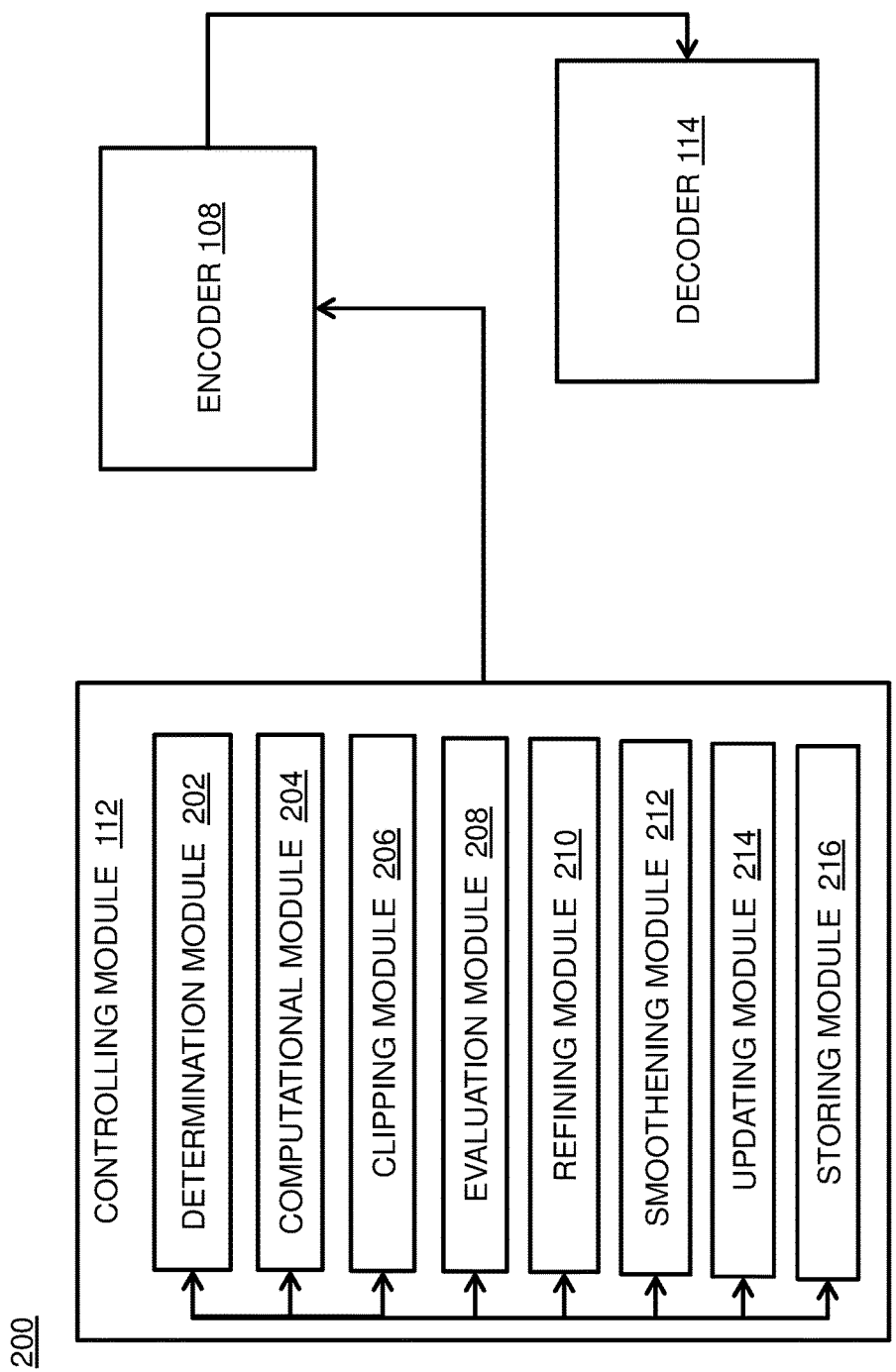
Figure 3:
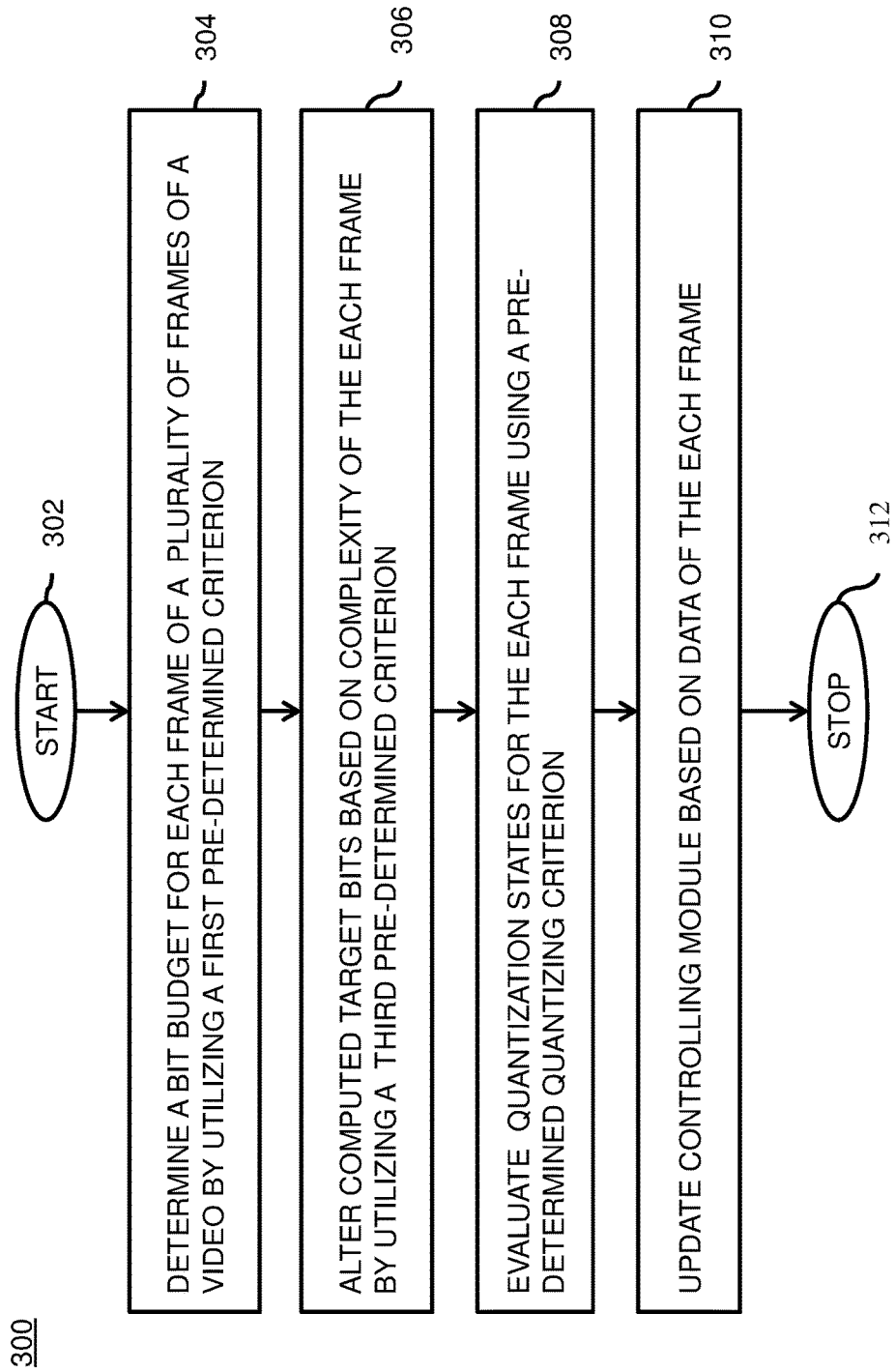
Figure 4:
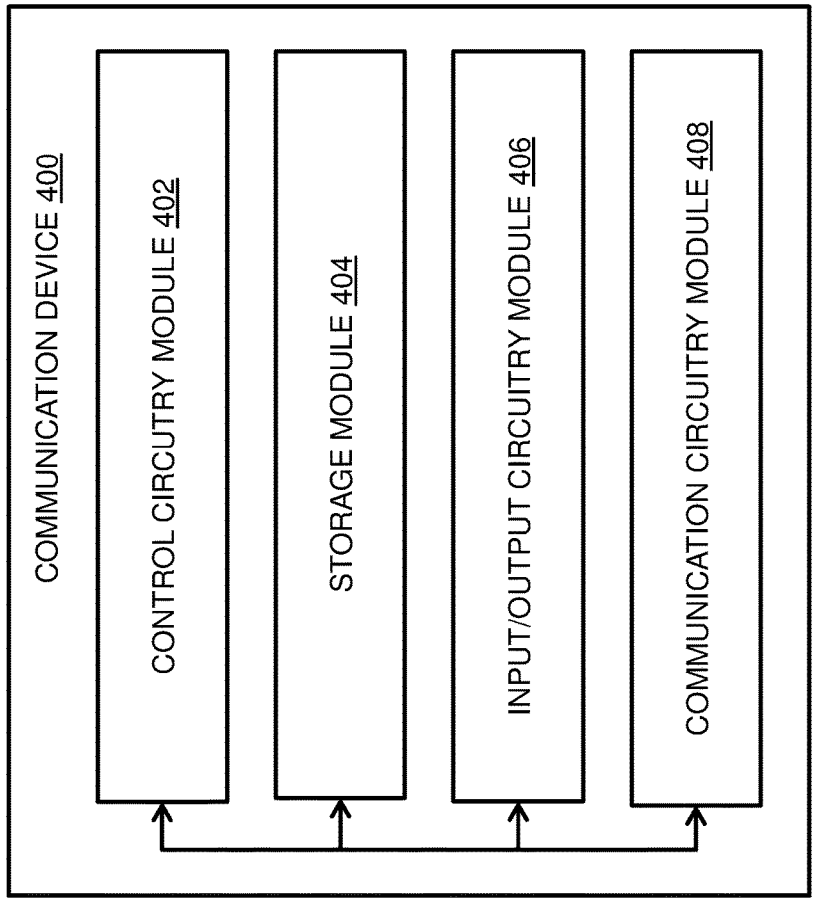

Having thus described the invention in general terms, reference will now be made to the accompanying drawings, which are not necessarily drawn to scale, and wherein:

FIG. 1 illustrates a system for controlling bit rate and quantization step size of each frame of a plurality of frames of a video in encoding of the video, in accordance with various embodiments of the present disclosure;

FIG. 2 illustrates an interaction between a controlling module, an encoder and a decoder, in accordance with various embodiments of the present disclosure;

FIG. 3 illustrates a flowchart for controlling the bit rate and the quantization step size of the each frame of the plurality of frames, in accordance with the various embodiments of the present disclosure; and FIG. 4 illustrates a block diagram of a communication device, in accordance with various embodiments of the present disclosure.

DETAILED DESCRIPTION

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates a system 100 for controlling bit rate and quantization step size of each frame of a plurality of frames of a video in encoding of the video, in accordance with various embodiments of the present disclosure. The video encoding converts a video input into a digital format that is compatible with most types of web players and portable communication devices. The system 100 includes a video encoding and decoding system 102 and a communication device 104 associated with a user 106. The communication device 104 may include but not be limited to mobile phones, laptops, desktops, tablets or any other communication device known in the art which is capable of running a video content. Further, the video encoding and decoding system 102 includes an encoder 108 associated with a video 110, a controlling module 112, a decoder 114, a communication network 116a-b, one or more sensors 118, a processor 120 and an encoded video data 122.

The encoder 108 may include any type of device that encodes the video 110 into an encoded digital format. Examples of the encoded digital formats include but may not be limited to MPEG-1, MPEG-2, H.261, H.263 and the like. The encoder 108 receives inputs from each of the controlling module 112 and the processor 120. The processor 120 is connected with the one or more sensors 118. The controlling module 112 controls the bit rate and the quantization step size of the each frame of the plurality of frames of the video 110 and transmits this data to the encoder 108 through the communication network 116a. In an embodiment of the present disclosure, the communication network 116a-b may be an interconnection between the encoder 108 located in a different location to that of the decoder 114. In another embodiment of the present disclosure, the communication network 116a-b may be a wireless transmission system with transmitters and receivers.

The one or more sensors 118 located proximate to the user 106 detects a location of the user 106 associated with the communication device 104 using a light reflection circuit. Further, the one or more sensors 118 transmit the detected location of the user 102 to the processor 120. The processor 120 processes the detected location to extract one or more parameters and transmits processed data to the encoder 108 through the communication network 116a. In an embodiment of the present disclosure, the detected location of the user 106 may be utilized by the processor 120 to detect internet connection speed, parameters based on link speed, screen-size of the communication device 104, playback capabilities of a browser of the communication device 104 or any other parameter which can help the video encoding and decoding system 102 to deliver a video with best resolution to the user 106. For example, a user X with a communication device Y is in town hall street, the sensor will extract parameters like internet speed in the town hall street, browser capabilities of the communication device Y and screen size of the communication device Y. In an embodiment of the present disclosure, the processor 120 may receive display information from the communication device 104 through the communication network 116b. In another embodiment of the present disclosure, the communication network 116b connects the decoder 114 and the one or more sensors 118 to the processor 120.

The encoder 108 encodes the each frame of the plurality of frames of the video 110 along with considering the inputs received from the controlling module 112 and the processor 120. Output obtained from the encoder 108 is referred to as the encoded video data 122. The decoder 114 receives the encoded video data 122 and re-constructs each frame of the encoded video data 122 for viewing a high quality video on the communication device 104 associated with the user 106. For example, an encoder E encodes a video V with bitrate controlling parameters obtained from a controlling module M and location parameters obtained from a processor P and transmits it over to a decoder D to re-construct the video V to be displayed on a communication device Y of the user X.

It may be noted that in FIG. 1, the communication device 104 is shown; however those skilled in the art would appreciate that more number of communication devices can used to implement functioning of the system 100. It may also be noted that in FIG. 1, the user 102 watches the re-constructed video; however those skilled in the art would appreciate that there may be more number of users watching the re-constructed video.

FIG. 2 illustrates a system 200 showing an interaction between the controlling module 112, the encoder 108 and the decoder 114, in accordance with various embodiments of the present disclosure. It may be noted that to explain system elements of FIG. 2, references will be made to the system elements of FIG. 1. The controlling module 112 includes a determination module 202, a computational module 204, a clipping module 206, an evaluation module 208, a refining module 210, a smoothening module 212, an updating module 214 and a storing module 216.

The controlling module 112 controls number of bits spent by the each frame and ensures that total bits spent for a second frame of the plurality of frames is almost equal to required bitrate. The deviation between the required bitrate and real bitrate is compensated in coming frames within a pre-defined time (for example, 2 to 5 seconds). The determination module 202 determines a bit budget for the each frame of the plurality of frames of the video 110 utilizing a first pre-determined criterion. The plurality of frames includes a plurality of intra-coded frames (hereinafter I-frames), a plurality of predicted frames (hereinafter P-frames) and a plurality of bidirectional predicted frames (hereinafter B-frames). In an embodiment of the present disclosure, the bit budget for the I-frames and the P-frames are calculated based on an I-P-P structure. In the I-P-P structure, the each frame of the plurality of frames of the video 110 is compressed using one or more process steps centered on amount of data compression. The one or more process steps for the each frame of the plurality of frames of the video 110 are called picture types/frame types. In an embodiment of the present disclosure, the picture types/frame types denotes the plurality of frames illustrated above and posses different characteristics.

For example, the I-frames are least compressible and do not require other frames to decode itself. The P-frames are more compressible than the I-frames and uses data from previous frames to decompress. In an embodiment of the present disclosure, the I-frames may be generated by the encoder 108 to create a random access point (to allow the decoder 114 to start decoding from a scratch at that picture location). The P-frames can reference previous pictures in decoding order.

The first pre-determined criterion includes calculations for determining the bit budget for the each frame of the plurality of frames of the video 110. The bit-budget is calculated as follows:

$$\text{maxbitP} = \frac{\text{bitrate}}{(fps - 1) + IPRatio}$$

$$\text{maxbitI} = \text{maxbitP} \times IPRatio$$

The maxbitP denotes maximum budget bits for each of the P-frames, maxbitI denotes maximum budget bits for each of the I-frames, bitrate is the number of bits processed per unit time in each of the P-frames, fps denotes frames processed per second in the video 110 and IPRatio denotes the ratio of number of the I-frames to the P-frames.

The computational module 204 computes target bits of the each frame of the plurality of frames of the video 110 utilizing a second pre-determined criterion. The second pre-determined criterion includes calculation of the target bits for the each frame of the plurality of frames of the video 110. The target bits are calculated as follows:

$$\text{target bits} = \frac{\text{remaining bits}}{\text{number of } P - \text{frames} + \text{number of } I - \text{frames} \times IPRatio}$$

$$\text{target bits for } P - \text{frames} = targetbits$$

$$\text{target bits for } I - \text{frames} = targetbits \times IPRatio$$

The remaining bits denote the number of bits left with the each frame.

In an embodiment of the present disclosure, more target bits should not be allotted when there are the remaining bits with each of the frame of the plurality of frames. The allotment of the more target bits decreases quantization states (hereinafter QS). Further, the bitrate may exceed the required bitrate. In addition, when all the remaining bits are exhausted, the targetbits may become lower or even negative which leads to degradation of quality of the video 110 due to increase in the QS and decrease in the target bits. Thus, minimum amount of the target bits may be allotted to avoid quality degradation even though the bitrate is little higher than the required bitrate.

Therefore, the clipping module 206 clips the computed target bits of the each frame of the plurality of frames. The clipping is performed as follows:

The target bits for the P-frames are clipped between $$\frac{3 \times \text{maxbitP}}{2} \text{ and } \frac{\text{maxbitP}}{4}$$

The target bits for the I-frames are clipped between $$\frac{3 \times \text{max}bitI}{2} \text{ and } \frac{\text{max}bitI}{4}$$

Furthermore, the computational module 204 alters the target bits based on complexity of the each frame of the plurality of frames utilizing a third pre-determined criterion. The third pre-determined criterion is based on the determined bit budget and a histogram gradient. The histogram gradient is a feature descriptor for image processing and object detection. The third pre-determined criterion is described as follows:

If the targetbits of present frame of the plurality of frames is less than maximum budget bits and the histogram gradient is greater than 49 and less than 1000, then the target bits are altered as follows:

Target bits=(targetbits×50)/histogram gradient

In an embodiment of the present disclosure, if a frame has special characteristics like scene change, dissolving effect, fading effect or is an I-frame, then different criteria described above corresponding to the I-frames are followed.

The evaluation module 208 evaluates the quantization states for the each frame of the plurality of frames of the video 110 using a pre-determined quantizing criterion. The pre-determined quantizing criterion is described as follows:

$$QS = 2^{\frac{QP}{6}}$$

Where, $$QP = 40 \times e^{0.2 - 3 \times bpp}$$

$$bpp = \frac{bitrate}{framerate \times width \times height}$$

In an embodiment of the present disclosure, the QS are restricted not to exceed 20 to maintain the quality of the video 110. In another embodiment of the present disclosure, the QS are refined based on complexity of the each frame of the plurality of frames. For the refining, the histogram energy difference (histSAD) between the present frame and previous frame is calculated. The higher level (more than 15) of the QS of the present frame and low (less than 20) histSAD implies that the complexity of the present frame is low and the QS is under control and may not consume more bits. Thus, the QS is relaxed as QS=QS×0.7937 and otherwise the QS is relaxed as QS=QS×1.2599. However, if the complexity is high (more than 1000), then the QS is doubled. If the QS are increased, the amount of targetbits is increased by 10%. In an embodiment of the present disclosure, the QS refinement is done for the each frame except first frame.

Furthermore, the evaluation module 208 allots the quantization states for three subsequent frames of the plurality of frames based on the determined bit budget. In an embodiment of the present disclosure, the evaluation module 208 requires at-least three different data points to predict the QS for the three subsequent frames for a given rate. The QS for first three I-frames and first three P-frames are calculated as follows:

If the QS of previous frame (of same type) is less than 70, then the bits consumed by previous frame is more, then the QS is calculated as:

QS of present frame=QS of previous frame×1.1225

Otherwise QS of present frame=QS of previous frame× 0.8909 is considered to increase the rate. In an embodiment of the present disclosure, after the three frames, the evaluation module 208 assigns the QS for rest of the frames of the plurality of frames based on the computed target bits in a following way:

$$QS = \begin{cases} \frac{2 \times a[IorP]}{\sqrt{\delta} - b[IorP]}, & a[IorP] > 0 \\ QSp \times 0.8909, & \text{else} \end{cases}$$

Where, $$\delta = (b[IorP])^2 + 4 \times a[IorP] \times R$$

R are targetbits
a[I or P] is a-parameter for I-frame or P-frame
b[I or P] is b-parameter for I-frame or P-frame
QSp is QS of previous frame In an embodiment of the present disclosure, the evaluation module 208 ensures that the QS is not lower than 6.25 to have controlled bits consumption. The refining module 210 refines the evaluated quantization states of the each frame of the plurality of frames using a plurality of pre-determined refining criteria. In an embodiment of the present disclosure, the QS is refined based on the complexity of the present frame and for the scene-change, the QS of the subsequent 15 frames are refined based on the complexity of the present frame, and the targetbits of the present and the previous frames. When the complexity is high (more than 50) and the target bits of the present frame is less than that of the previous frame and the maximum budget bits, then the QS is doubled. In another embodiment of the present disclosure, the refinement may be done for only 15 frames.

The pre-determined refining criteria include a first refining criterion and a second refining criterion. The first refining criterion is followed when the target bits of the present frame is less than the maximum budget bits. Further, the each frame consumes more number of bits. The second refining criterion is followed when the target bits of the present frame is greater than or equal to the maximum budget bits. Further, the each frame consumes less number of bits. The first refining criterion is described as follows:

If the targetbits of the present frame are less than that of the previous frame, the QS are increased fast. Further, if the QS is less than 15, then QS=(QS+15)/2 will be allotted to avoid more bit consumption and if the QS is more than 15, the QS is reduced by half, QS=QS/2. However, if the target bits of the present frame is greater than or equal to that of the previous frame and less than 120% of the target bits of the previous frame, the QS is decreased slowly, and QS=QS× 1.2599. If this condition is not satisfied, then same QS may be considered.

In the second refining criterion, the QS can be relaxed in a controlled fashion and is described as follows: If the target bits of the present frame is equal to the maximum budget bits, then QS=QS×QSM4. Moreover, if the targetbits of the present frame is more than or equal to 105% of that of the previous frame, then following calculations may be performed.

$$QS = \begin{cases} QS \times 0.25 & QS > 70 \\ QS \times 0.50 & QS > 50 \\ QS \times 0.56 & QS > 15 \\ QS \times 0.63 & \text{else} \end{cases}$$

If the target bits of the present frame is less than or equal to 95% of the target bits of the previous frame, then the QS is refined as mentioned below.

$$QS = \begin{cases} 15, & QS < 15 \\ QS \times 1.26 & \text{else} \end{cases}$$

If the targetbits of the present frame is greater than 95% and less than 105% of the target bits of the previous frame, then the QS is adjusted by QS=QS×0.63.

Going further, the smoothening module 212 performs smoothening of the refined quantization states of the each frame of the plurality of frames. The smoothening is performed based on a group of pictures and the number of frames per second. The smoothening module 212 calculates the number of frames for which the QS is allotted. The number of frames is calculated as:

Frames=number of I-frames+number of P-frames+ number of frames in pipeline (threads)

The smoothening module 212 performs smoothening of the refined quantization states of the each frame as follows: If the frame is the first frame followed by a P-frame, then the QS are smoothened as follows: QS=(3×QS+QS of previous P-frame)/4. If the frame is the P-frame following an I-frame, then the QS are smoothened as follows: QS=(3×QS+QS of I-frame)/4. If the frame is the P-frame and the QS are less than 5, then the QS are smoothened as follows: QS=(3× QS+QS of previous P-frame)/4. In an embodiment of the present disclosure, in case of the scene change, the fading effect, the dissolving effect or the I-frames, the QS is clipped between 8.875 and 40 to maintain the quality of the each frame.

Furthermore, the evaluation module 208 allots the quantization states to each of one or more macroblocks of the each frame of the plurality of frames of the video 110. The QS for each macroblock (QSi) of the one or more macroblocks in the each frame is allotted based on the complexity of the each frame as follows.

$$QS_i = \frac{(4 \times MBC + 2 \times AVGC) \times QS}{2 \times MBC + 3 \times AVGC + 1}$$

Where,
MBC is Complexity of Macroblock
AVGC is average complexity of the frame
QS is the Quantization Step of present frame
And the QSi is clipped between 2.5 and 100.75 to avoid extreme bit variation.

In an embodiment of the present disclosure, the MBC and the AVGC are calculated based on Sum of Absolute of Normalized Difference (SAND) with respect to mean of the each macroblock.

Going further, the encoder 108 encodes the each frame of the plurality of frames of the video 110 with the allotted quantization states and the processed information obtained from the processor 120 (as exemplarily described in detailed description of FIG. 1). Furthermore, the updating module 214 of the controlling module 112 updates the controlling module 112 based on data of the each frame of the plurality of frames. The data is extracted during the evaluation of the quantization states, and the data includes at least one of the number of bits spent per second in the encoding of the each frame of the plurality of frames, complexity of the each frame of the plurality of frames and the quantization states for the each frame of the plurality of frames.

The storing module 216 stores the computed target bits, the allotted quantization states and characteristics of one or more pictures of the each frame of the plurality of frames of the video 110 for future reference. Moreover, the storing module 216 maintains a table in which the QS and the number of bits spent is stored separately for the I-frames and the P-frames. Furthermore, the stored values are updated every time after the encoding. The table maintained by the storing module 216 is shown as follows:

| QS | ... |
|---|---|
| Bits-spent by I-frame model | ... |
| Bits-spent by P-frame model | ... |

An a-parameter and a b-parameter for the I-frames and the P-frames may be calculated based on details of available QS and the number of bits spent.

$$a_i = \frac{(QS_1 \times QS_2) \times (QS_1 \times R_1 - QS_2 \times R_2)}{(QS_2 - QS_1)}$$

$$b_i = \frac{R_1 \times QS_1^2 - R_2 \times QS_2^2}{(QS_2 - QS_2)}$$

The a-parameter and the b-parameter may be calculated for each set of the QS and the target bits. The average of the a-parameter and the b-parameter is determined when the a-parameter is positive. Else, the parameters may be kept same as earlier parameters.

Going further away, the decoder 114 re-constructs the each frame of the plurality of frames of the encoded video data 122 for viewing the high quality video on the communication device 104 associated with the user 106. In an embodiment of the present disclosure, the re-constructing of the encoded video data 122 differs depending on the encoder 108. In addition, the encoder 108 and the decoder 114 normally change encoding parameters on a periodic basis including a frame-to-frame basis or a block-to-block basis. In another embodiment of the present disclosure, the encoder 108 includes an external input where the encoding parameters of the encoder 108 can be set if desired.

In an embodiment of the present disclosure, the bit rate and the quantization step size is controlled based on at least one of complexity of the each frame of the plurality of frames, the number of bits spent per second in the encoding of the each frame of the plurality of frames, the quantization states and the bit budget of the each frame of the plurality of frames.

For example, for controlling the bit rate and the quantization step size of the video V in the encoding of the video V by the encoder E, first the bit budget of different frames of the video is determined. Then, the target bits are computed followed by the clipping and the altering of the computed target bits based on the complexity of the different frames. Then, the quantization states for the frames are predicted and assigned to the frames. The quantization states are then refined, smoothened and finally allotted to each macroblock of each of the frames. The encoder E then encodes the video V. The controlling module is then updated and the values of the quantization states, the number of bits spent are stored.

It may be noted that the FIG. 2 includes various modules to describe functioning of the system 200; however those skilled in the art would appreciate that there can be more number of modules in the FIG. 2 that could describe the functioning of the system 200.

FIG. 3 illustrates a flowchart 300 for controlling the bit rate and the quantization step size of the each frame of the plurality of frames of the video 110 in encoding of the video 110, in accordance with the various embodiments of the present disclosure. It may be noted that to explain the process steps of FIG. 3, references will be made to the system elements of FIG. 1 and FIG. 2. The flowchart 300 initiates at step 302. Following step 302, at step 304, the determination module 202 determines the bit budget for the each frame of the plurality of frames of the video 110 by utilizing the first pre-determined criterion. At step 306, the computational module 204 alters the computed target bits based on the complexity of the each frame by utilizing the third pre-determined criterion. At step 308, the evaluation module 208 evaluates the quantization state for the each frame using the pre-determined quantizing criterion. At step 310, the updating module 214 updates the controlling module 112 based on the data of the each frame. The flowchart 300 terminates at step 312.

It may be noted that the flowchart 300 is explained to have above stated process steps; however, those skilled in the art would appreciate that the flowchart 300 may have more/less number of process steps which may enable all the above stated embodiments of the present disclosure.

FIG. 4 illustrates a block diagram of a communication device 400, in accordance with various embodiments of the present disclosure. The communication device 400 includes a control circuitry module 402, a storage module 404, an input/output circuitry module 406, and a communication circuitry module 408. The communication device 400 includes any suitable type of portable electronic device. Examples of the communication device 400 include but may not be limited to a personal e-mail device (e.g., a Blackberry™ made available by Research in Motion of Waterloo, Ontario), a personal data assistant ("PDA"), a cellular telephone, a Smartphone, a handheld gaming device, a digital camera, a laptop computer, and a tablet computer. In another embodiment of the present disclosure, the communication device 400 can be a desktop computer.

From the perspective of this disclosure, the control circuitry module 402 includes any processing circuitry or processor operative to control the operations and performance of the communication device 400. For example, the control circuitry module 402 may be used to run operating system applications, firmware applications, media playback applications, media editing applications, or any other application. In an embodiment, the control circuitry module 402 drives a display and process inputs received from a user interface.

From the perspective of this disclosure, the storage module 404 includes one or more storage mediums including a hard-drive, solid state drive, flash memory, permanent memory such as ROM, any other suitable type of storage component, or any combination thereof. The storage module 404 may store, for example, media data (e.g., music and video files), application data (e.g., for implementing functions on the communication device 400).

From the perspective of this disclosure, the I/O circuitry module 406 may be operative to convert (and encode/decode, if necessary) analog signals and other signals into digital data. In an embodiment, the I/O circuitry module 406 may also convert the digital data into any other type of signal and vice-versa. For example, the I/O circuitry module 406 may receive and convert physical contact inputs (e.g., from a multi-touch screen), physical movements (e.g., from a mouse or sensor), analog audio signals (e.g., from a microphone), or any other input. The digital data may be provided to and received from the control circuitry module 402, the storage module 404, or any other component of the communication device 400.

It may be noted that the I/O circuitry module 406 is illustrated in FIG. 4 as a single component of the communication device 400; however those skilled in the art would appreciate that several instances of the I/O circuitry module 406 may be included in the communication device 400.

The communication device 400 may include any suitable interface or component for allowing the user 102 to provide inputs to the I/O circuitry module 406. The communication device 400 may include any suitable input mechanism. Examples of the input mechanism include but may not be limited to a button, keypad, dial, a click wheel, and a touch screen. In an embodiment, the communication device 400 may include a capacitive sensing mechanism, or a multi-touch capacitive sensing mechanism.

In an embodiment, the communication device 400 may include specialized output circuitry associated with output devices such as, for example, one or more audio outputs. The audio output may include one or more speakers built into the communication device 400, or an audio component that may be remotely coupled to the communication device 400.

The one or more speakers can be mono speakers, stereo speakers, or a combination of both. The audio component can be a headset, headphones or ear buds that may be coupled to the communication device 400 with a wire or wirelessly.

In an embodiment, the I/O circuitry module 406 may include display circuitry for providing a display visible to the user 102. For example, the display circuitry may include a screen (e.g., an LCD screen) that is incorporated in the communication device 400.

The display circuitry may include a movable display or a projecting system for providing a display of content on a surface remote from the communication device 400 (e.g., a video projector). The display circuitry may include display driver circuitry, circuitry for driving display drivers or both. The display circuitry may be operative to display content. The display content can include media playback information, application screens for applications implemented on the electronic device, information regarding ongoing communications operations, information regarding incoming communications requests, or device operation screens under the direction of the control circuitry module 402. Alternatively, the display circuitry may be operative to provide instructions to a remote display.

In addition, the communication device 400 includes the communication circuitry module 408. The communication circuitry module 408 may include any suitable communication circuitry operative to connect to a communication network and to transmit communications (e.g., voice or data) from the communication device 400 to other devices within the communications network. The communications circuitry 408 may be operative to interface with the communication network using any suitable communication protocol. Examples of the communication protocol include but may not be limited to Wi-Fi, Bluetooth®, radio frequency systems, infrared, LTE, GSM, GSM plus EDGE, CDMA, and quadband.

In an embodiment, the communications circuitry module 408 may be operative to create a communications network using any suitable communications protocol. For example, the communication circuitry module 408 may create a short-range communication network using a short-range communications protocol to connect to other devices. For example, the communication circuitry module 408 may be operative to create a local communication network using the Bluetooth,® protocol to couple the communication device 400 with a Bluetooth,® headset.

It may be noted that the computing device is shown to have only one communication operation; however, those skilled in the art would appreciate that the communication device 400 may include one more instances of the communication circuitry module 408 for simultaneously performing several communication operations using different communication networks. For example, the communication device 400 may include a first instance of the communication circuitry module 408 for communicating over a cellular network, and a second instance of the communication circuitry module 408 for communicating over Wi-Fi or using Bluetooth®.

In an embodiment, the same instance of the communications circuitry module 408 may be operative to provide for communications over several communication networks. In an embodiment, the communication device 400 may be coupled a host device for data transfers, synching the communication device 400, software or firmware updates, providing performance information to a remote source (e.g., providing riding characteristics to a remote server) or performing any other suitable operation that may require the communication device 400 to be coupled to a host device. Several computing devices may be coupled to a single host device using the host device as a server. Alternatively or additionally, the communication device 400 may be coupled to the several host devices (e.g., for each of the plurality of the host devices to serve as a backup for data stored in the communication device 400).

The above stated method and system control the bit rate for any video sequence in a bandwidth constrained environment. Moreover, the method and system includes updating the controlling module 112. In addition, the method and system provides a different way of calculating the bit-budget. Moreover, the method and system involves complexity of the each frame in terms of the histogram gradient. Further, the method and system is independent of any codec.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A method for controlling bit rate and quantization step size of each frame of a plurality of frames of a video in encoding of said video, the method comprising:
    determining a bit budget for said each current frame of said plurality of frames of said video
    determining target number of bits for each current frame of a first set of frames of the plurality of frames of the video;
    evaluating quantization state of the first set of frames by calculating the quantization state based on the bit rate, the quantization step size, and width and height of the current frame;
    refining the evaluated quantization state by adjusting the evaluated quantization state based on the comparison between the target number of bits for the current frame and a previous frame;
    smoothing the refined quantization state by adjusting the refined quantization state based on checking a type of the current frame being an I-frame or P-frame and the type of the previous frame being an I-frame or P-frame;
    encoding the first set of frames based on the evaluated quantization state;
    storing information pertaining to the encoded first set of frames, wherein the information stored comprises the evaluated quantization state, number of bits spent in encoding and one or more characteristics of each frame of the first set of frames, wherein the information pertaining to I frames and P frames of the first set of frames are stored separately; and
    controlling the bit rate and the quantization step size of each frame of the remaining frames of the plurality of frames based on the type and complexity of each frame of the remaining frames and the stored information.

2. The method as claimed in claim 1, wherein controlling the bit rate and the quantization step size of each subsequent frame of the remaining frames among the plurality of frames based on type and complexity of each subsequent frame of the remaining frames, and the stored information comprising the steps of:
    determining target number of bits for each of the remaining frames of the plurality of frames of the video;
    determining frame type and complexity of each frame of the remaining frames, wherein the complexity is determined based on a histogram gradient;
    estimating a quantization state of each frame of the remaining frames based on the determined target number of bits, the frame type and the stored information;
    refining the quantization state of each frame of the remaining frames using the stored information and the determined complexity of each frame of the remaining frames;
    encoding each frame of the remaining frames using the refined quantization states; and
    updating the stored information with the refined quantization state, one or more characteristics, and number of bits spent in encoding each of the subsequent frames until a frame with a complexity greater than a predetermined complexity is to be encoded at which the remaining frames of the plurality of frames of the video are treated as a video whose plurality of frames are to be encoded.

3. The method as claimed in claim 1, wherein the method further comprises, clipping the determined target number of bits of each frame of the plurality of frames prior to evaluation of the quantization state.

4. The method as claimed in claim 1, wherein the first set of frames comprises at least an I frame and a plurality of P frames.

5. The method as claimed in claim 1, wherein refinement of the quantization state of the first set of frames is based on one or more of a histogram energy difference, the bit budget a determined target number of bits.

6. The method as claimed in claim 2, wherein complexity of each frame of the remaining frames is determined based on the histogram energy difference between a present frame and a previous frame.

7. The method as claimed in claim 1, wherein smoothening of the refined quantization state of the first set of frames is performed for a group of frames and using number of frames per second.

8. The method as claimed in claim 2, further comprising smoothening the quantization state of each frame of the remaining frames is performed for a group of frames and using number of frames per second.

9. The method as claimed in claim 1, wherein the evaluated quantization state of each frame of the first set of frames is assigned to each of the one or more macro-blocks in each frame based on the complexity of macro-blocks and average complexity of the frame.

10. The method as claimed in claim 2, wherein the estimated quantization state of each frame of the remaining frames is assigned to each of the one or more macro-blocks in each frame based on the complexity of each macro-block and average complexity of the frame.

* * * * *